United States Patent
Bozionek

(10) Patent No.: US 8,089,900 B2
(45) Date of Patent: Jan. 3, 2012

(54) METHOD FOR REPELLING UNWANTED SPEECH ADVERTISING FOR PACKET-ORIENTED COMMUNICATION NETWORKS

(75) Inventor: Bruno Bozionek, Borchen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 177 days.

(21) Appl. No.: 12/519,035

(22) PCT Filed: Nov. 26, 2007

(86) PCT No.: PCT/EP2007/062809
§ 371 (c)(1),
(2), (4) Date: Oct. 26, 2009

(87) PCT Pub. No.: WO2008/071537
PCT Pub. Date: Jun. 19, 2008

(65) Prior Publication Data
US 2010/0034121 A1 Feb. 11, 2010

(30) Foreign Application Priority Data
Dec. 14, 2006 (DE) .......................... 10 2006 059 148

(51) Int. Cl.
*H04J 1/16* (2006.01)
*H04L 1/00* (2006.01)
*H04L 12/26* (2006.01)
(52) U.S. Cl. ........................................ 370/252; 370/352
(58) Field of Classification Search ........... 370/252.352, 370/356, 352; 713/176; 379/210.02
See application file for complete search history.

(56) References Cited

U.S. PATENT DOCUMENTS
2005/0210272 A1* 9/2005 Fotta .............................. 713/188
2007/0071212 A1* 3/2007 Quittek et al. ........... 379/210.02
(Continued)

FOREIGN PATENT DOCUMENTS
EP 1691538 A1 8/2006
(Continued)

OTHER PUBLICATIONS
International Search Report for PCT/EP2007/062809 dated May 2, 2008 (Form PCT/ISA/210).
(Continued)

*Primary Examiner* — Ayaz Sheikh
*Assistant Examiner* — Chuong T Ho

(57) ABSTRACT

A service (LD) according to the invention is disclosed for managing lists in a packet-oriented network (LAN) for end devices (EG) of the network, said service providing a first (blacklist) and second (whitelist) list (L1, L2) of identifiers (id, rn) in which one or no unwanted speech advertising SPIT or unsolicited bulk communications are to be expected. A call is directed to the service (LD), and the identifier (idx) of the call is compared to the identifiers (id, m) in the lists (L1, L2). A call whose identifier (idx) is not contained in the lists (L1, L2) is directed to the addressed end device (EGx) and transmitted following acceptance. After determination of a call with or without unwanted speech advertising (SPIT), a first or second piece of information (z1, z2) inputted to the end device (EGx) is transmitted to the service (LD) in the packet-oriented network (LAN), and the identifier (idx) of the call is assigned to the first or second list (L1, L2). The handling of the lists, and therefore the comfort for the subscriber, is increased by the central management of the lists (L1, L2) by a service (LD) in the network and by simple input to the end device.

18 Claims, 2 Drawing Sheets

U.S. PATENT DOCUMENTS

2007/0118750 A1* 5/2007 Owen et al. .................. 713/176
2009/0067410 A1* 3/2009 Sterman et al. ............... 370/352
2009/0106318 A1* 4/2009 Mantripragada et al. .. 707/104.1
2010/0226261 A1* 9/2010 Piche ............................ 370/252

FOREIGN PATENT DOCUMENTS

WO 2006103142 A1 10/2006

OTHER PUBLICATIONS

Rowher, T., et al. "TNG White Paper: Abwehr von Spam over Internet Telephony (SPIT-AL)", Jan. 31, 2006.

International Preliminary Report on Patentability for PCT/EP2007/062809 dated Mar. 24, 2006 (Form PCT/IPEA/406).

* cited by examiner

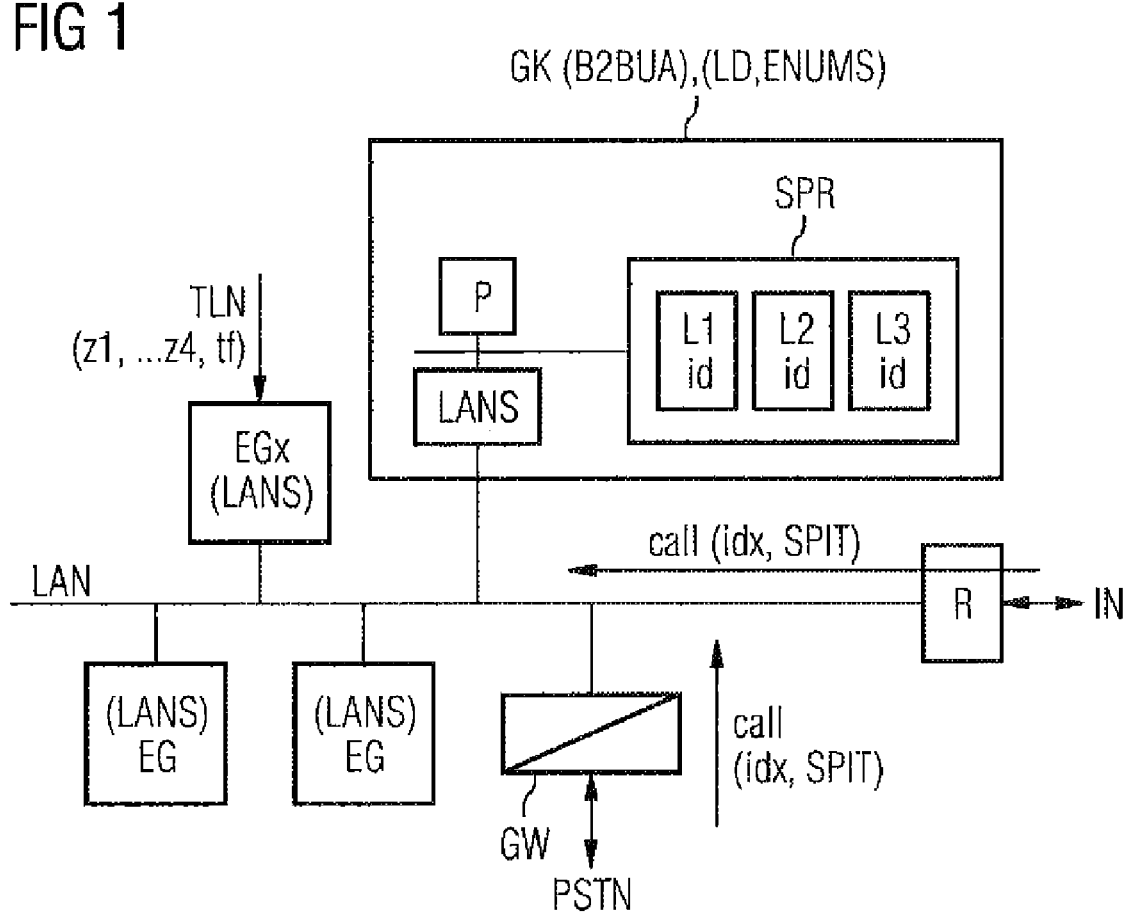

METHOD FOR REPELLING UNWANTED SPEECH ADVERTISING FOR PACKET-ORIENTED COMMUNICATION NETWORKS

CROSS-REFERENCE TO RELATED APPLICATIONS

This application is the United States national phase under 35 U.S.C. §371 of PCT International Application No. PCT/EP2007/062809, which claims priority to DE 10 2006 059 148.8 filed on Dec. 14, 2006. Both of those applications are incorporated by reference herein.

BACKGROUND OF THE INVENTION

1. Field of the Invention

Embodiments relate to rejection of unwanted speech advertising.

2. Background of the Related Art

To an increasing degree Internet telephone subscribers or their end devices such as personal computers are being confronted with unwanted telephone advertising or speech advertising, also known in professional circles as SPIT (SPam over Internet Telephony). The unwanted speech advertising is being carried out by automatic calling units, which are used to transmit unwanted messages randomly or purposefully via VoIP (Voice over IP) techniques to telephone subscribers in an attempt to sell merchandise or services to the called telephone subscriber via stored, predetermined speech information or to induce the called telephone subscriber to make an expensive callback to a premium service.

One possibility for protecting oneself to some extent from unwanted speech advertising is using a list known in professional circles as the "Robinson List." Telephone subscribers can arrange to be registered on the Robinson List maintained by the German Direct Marketing Association in order to keep advertising companies belonging to the association from sending the registered telephone subscribers any telephone advertising or advertising via fax or e-mail. However, it must be noted that the use of these lists by advertising companies is voluntary and not all advertising companies are members of the association. In addition, this Robinson List is only in effect in Germany, i.e., it cannot prevent telephone advertising originating from another country.

A further possibility for preventing unwanted advertising is looping an answering machine into every incoming call. The disadvantage of this method is the unnecessary allocation of resources (trunk lines, storage space) by the party being called. In addition, the caller possibly achieves his objective of a time-delayed callback.

An additional possibility is providing a whitelist and a blacklist with identifiers or call numbers, from which unwanted advertising or speech advertising is or is not to be expected. The identifier of the caller for an incoming call is compared with the identifiers in the lists. If, for a call, the identifier of the caller is not contained in the lists, the call is directed to call handling, where a check is performed to see whether advertising is being received. The lists are correspondingly updated based on the result of the check.

BRIEF SUMMARY OF THE INVENTION

The objective on which the invention is based is improving the rejection of calls with spam over internet telephony (SPIT) with regard to convenience.

An essential aspect of the inventive method is that, for end devices in a packet-oriented network, a service is provided to manage lists, which provides a first and second list of identifiers in which unwanted speech advertising is or is not to be expected. An incoming call is directed to the service, the caller identifier is compared to the identifiers in the lists, and a call whose caller identifier is not contained in the lists is directed to the addressed end device. The incoming call is transmitted to the end device and, after it is determined to be a call with or without unwanted advertising, a first or second piece of information input to the end device is transmitted to the service in the packet-oriented network and the identifier of the incoming call is assigned to the first or second list. In the case of a call where no evaluation can yet be made with respect to telephone advertising, a third piece of information input to the end device is transmitted to the service in a packet-oriented network and the identifier of the call is assigned to a third list.

An essential advantage of the invention can be seen in the fact that, for each end device, the lists are managed by a service in the network and simple inputs to the end device are used for assignment of the lists maintained in a packet-oriented network, increasing the telephone subscriber's convenience in handling the lists. In addition, in the case of lists that are maintained centrally in the network, the identifiers for multiple end devices with unwanted speech advertising or spam over internet telephony (SPIT) messages can be determined, and the respective identifiers that are not yet present can be updated in the lists of several end devices. Alternatively, individual first, second and third lists can be provided or administered respectively for all end devices of the packet-oriented network, so that, after a call is evaluated by the end devices and a corresponding piece of information is input, the identifiers of the calls are entered into the respective list. This makes it possible to achieve a substantially greater level of effectiveness in determining the identifiers with unwanted speech advertising.

A first piece of information is advantageously represented by a first ID or a first key function, the second piece of information by a second ID or second key function, and the third piece of information by a third ID or third key function, and the identifier of the transmitted call is assigned to the first, second or third list depending upon the input of the first, second or third ID or activating the first, second or third key function. In this case, the ID may be numeric or alphanumeric and the key function may be realized by a mechanical key or by a key function in the display unit, wherein the key function is formed in turn by numeric or alphanumeric information.

According to one further development of the inventive method, in the case of a fourth piece of information input to the end device and transmitted to the service in a packet-oriented network, the incoming call is routed for automatic call handling, and the result of the check, represented by an ID number or key function, is transmitted to the service in the packet-oriented service and the identifier of the call is assigned to the first, second [or] third list depending upon the transmitted result of the check. Because the same IDs or key functions are used, there is no need to convert the result of the check in a packet-oriented network.

According to one advantageous further development of the invention, automatic call handling checks the call to see whether it was made by an automatic calling unit with automatically announced telephone advertising. This may be accomplished advantageously in that a determination is made during call handling, on the basis of the speech pause/speech duration ratio of the received speech information, as to whether the current call is being made by an automatic calling unit with automatically announced telephone advertising. Alternatively, call handling can perform a speech interaction with the caller, wherein a predetermined speech reaction to a speech query is expected, and when there is not an appropriate speech reaction by the caller, the call is determined to be a call with telephone advertising. These advantageous developments make it possible to determine in a cost-effective manner whether an automatic calling unit that wants to transmit telephone advertising is calling or whether a telephone subscriber, i.e., a person, is calling.

The invention integrates particularly advantageously into service equipment of the packet-oriented network, wherein the service equipment consists of a gatekeeper or a back-to-back user agent in a packet-oriented network, in accordance with the H.323 protocol or SIP protocol.

Other advantageous further developments of the invention can be found in the subordinate claims.

BRIEF DESCRIPTION OF THE SEVERAL VIEWS OF THE DRAWINGS

The invention and its further developments will be explained in the following on the basis of two graphic representations. The drawings show:

FIG. 1 A network topology, in which the invention is realized, and

DETAILED DESCRIPTION OF THE INVENTION

Figure 2A:
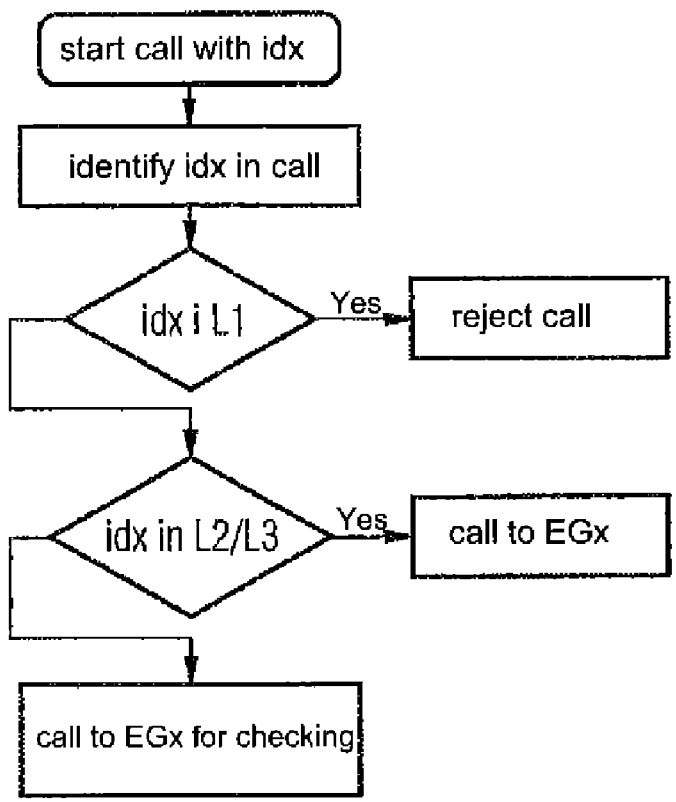
FIG. 2 A flow chart of the handling of an incoming call in the depicted network topology.

FIG. 1 shows an example of a network topology in which the inventive method may be used. Connected to a local network LAN (hereinafter designated as LAN) are end devices EG of telephone subscribers TLN, wherein the end devices EG are connected via a LAN interface LANS, e.g., an Ethernet interface, to the LAN, e.g., an Ethernet. The LAN interface LANS in this case represents the receiving means for all pieces of information transmitted by the LAN. The end devices for local networks are often personal computers with a telephone function or IP telephones for local networks. An Ethernet protocol is provided for the LAN, for example, and the H.323 protocol or the SIP protocol is provided for the telephone function or the voice over IP function in the personal computer or in the telephone for local networks.

The H.323 protocol is an ITU standard, which defines a protocol that makes audio-visual communication possible in every network that transmits packets. The H.323 standard consists of a complete series of protocols for signaling, for exchanging end device functionalities, for controlling connections, for exchanging status information and for controlling the data flow. The multimedia standard recognizes three different signaling functions between the H.245 control channel, the Q.931 signaling channel and the RAS channel. An essential component for IP telephony, in addition to the end devices, is a gatekeeper GK connected to the LAN via a LAN interface LANS, which implements the interface functions defined in the H.323 framework standard and serves mainly to emulate the PSTN connection structure via the IP network and to adapt the data streams. To do this, it performs the signaling, the required translation of telephone numbers into IP addresses and vice versa, and subsequently the packet assembly of the synchronous data stream from the telephone network to the IP packets according to the H.225 standard. A gateway GW that is also connected to the LAN is provided for connection to the PSTN (Public Switched Telephone Network), through which the telephone information from the PSTN is inserted into packets and vice versa.

The SIP protocol is functionally comparable to the H.323 protocol and can transmit interactive communication services including speech over IP networks. It is simpler than H.323 and is also scalable through the use of a transaction model instead of a connection model. The SIP information can be transported via the TCP protocol or the UDP protocol and has an open internet-based structure, which permits signalizing services such as transmitting the caller's identity or call forwarding in IP-based networks, as well as call holding, hold music, call transfer with callback, call forwarding, call pick-up, initiating conference calls, recalls, etc. Instead of a gatekeeper GK, an SIP proxy server or a back-to-back user agent (indicated in the figure by the designation B2BUA) is provided for connection and feature control with the SIP protocol. In this case, user agents are provided in the end devices or in the SIP telephones, which realize applications in the SIP telephones and form an interface between the user and the SIP network. A back-to-back user agent B2BUA is an application which functions as an intermediary between two telephone subscribers or SIP telephones, but appears as an end point vis-à-vis the two telephone subscribers.

The LAN is also connected to a router R, which functions as a transfer device to the internet IN. The connection to the internet is normally accomplished via an access router of an internet service provider (not shown).

It is assumed for the exemplary embodiment that a SPIT routine SPR is realized in the gatekeeper GK or in the back-to-back user agent B2BUA, in which a first list L1 or whitelist, a second list L2 or blacklist, and a third list L3 or greylist is managed or administered for each end device. The SPIT routine SPR represents a service LD for managing lists L and acts as an assigning means, which is used to register the identifiers in one of the three lists L1-L3. In addition, the SPIT routine functions as a comparison means, which can compare an identifier id contained in an incoming call with the identifiers id in lists L1 through L3.

Identifiers id of calls in which telephonic or speech advertising SPIT was detected are recorded in the first list L1. Calls that do not contain any speech advertising are assigned to the second list L2. The third list L3 contains identifiers where it was not possible to make an evaluation regarding speech advertising SPIT.

It is assumed for the exemplary embodiment that a call which may contain unwanted speech advertising SPIT can be directed either by the PSTN or by the internet IN via the router R and via the LAN to the gateway GW (represented in FIG. 1 with arrows labeled "call").

A call from the internet IN normally features an internet address, and a call from the PSTN has a call number rn in accordance with E.164. An ENUM (telephone numbering mapping) service may also be used in the case of a voice over IP call. ENUM solves the problem of mapping real telephone numbers to internet addresses. As a result, an existing VoIP telephone connection can be found and a connection can be established to the PSTN in a cost-effective way via the internet or via a gateway GW.

A processor system P is provided to control the gatekeeper GK or the back-to-back user agent B2BUA, wherein incoming calls can be relayed using the processor system P or its programs to the service LD or the end device EG that is addressed by the transmitted identifier id.

In accordance with the invention, according to the flow chart in FIG. 2a, prior to the relaying of an incoming call, the identifier id of the call is detected with the aid of the processor system P and directed to the SPIT routine SPR. The SPIT routine SPR is used to compare the detected identifier idx of the call with the identifiers id in lists L1, L2, L3. If the detected identifier idx is contained in the first list, the call is rejected, i.e., the call is not relayed to the addressed end device EGx. If the identifier idx is contained in the second list L2, the call is relayed to the addressed end device EGx. If the identifier idx is contained in the third list L3, the call is also relayed to the addressed end device, however, information can be conveyed at the same time that indicates to the end device or the telephone subscriber that it was not possible to make an evaluation with regard to speech advertising for this identifier id or call.

The call is signaled in the addressed end device EGx, i.e., calling tones or call information are generated in the end device and emitted acoustically and/or visually. After the telephone subscriber of the end device EGx accepts the call, e.g., by picking up the telephone receiver or by activating the telephone function on the personal computer, the call is acoustically transmitted to the end device EGx. After the telephone subscriber checks whether the call is a call with or without unwanted telephone advertising, appropriate information is input by the telephone subscriber.

The information input may be an ID number z input via the telephone keypad or PC keyboard or information that is generated by a key function tf, i.e., by actuating a key on the telephone. The information generated by a key function tf may represent any numeric or alphanumeric information. It is assumed for the exemplary embodiment that a first through fourth ID number z1-z4 is provided for an assignment to the first, second or third list L1-L3 or for relaying to automatic call handing CALL-C.

Figure 2B:
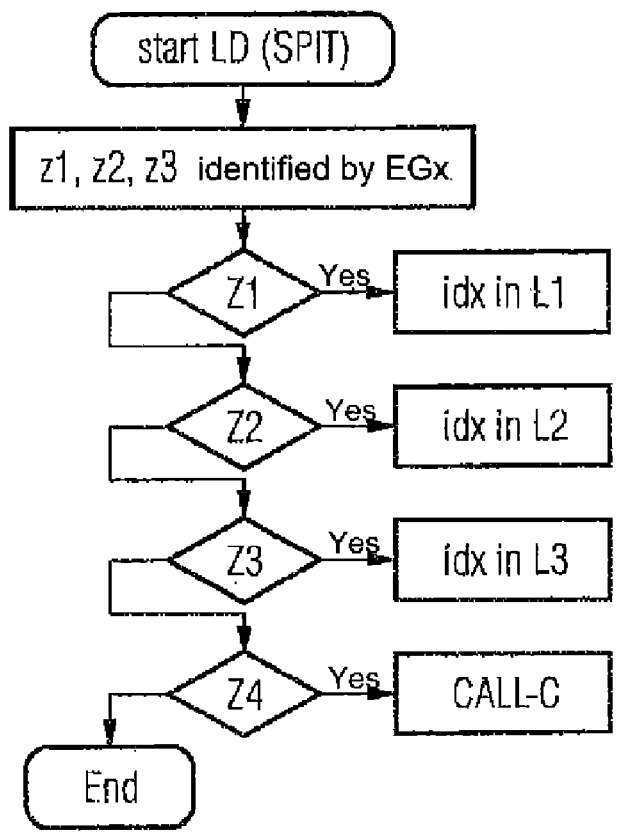

If a first ID number z1 is input by the telephone subscriber, it is transmitted along with the identifier idx of the call to the gatekeeper GK or back-to-back user agent B2BUA in accordance with the LAN protocol being used. In the gatekeeper GK, as depicted in FIG. 2b, the ID number z1 and the identifier idx are transmitted to the SPIT routine SPR, and the identifier idx is entered in the first list L1. The procedure is analogous if the second or third ID number z3, z3 is input and transmitted, i.e., the identifier id transmitted is entered into the second or third list L2, L3.

Alternatively, the identity of the caller can be determined prior to the call being accepted by the telephone subscriber. In this case, for example, the reverse ENUM method or a random test method may be used. In the case of the ENUM method, a check is made to see whether the voice over IP identity of the caller is known in the ENUM service ENUMS, wherein the ENUM service is available in the gatekeeper GK or LAN and is indicated in the figure by the designation ENUMS. Through a query to the ENUM service ENUMS, it is possible to make a determination here from the IP address or a special ENUM identifier of the associated E.164 address and if possible, check it.

If a result of the check is available, it is transmitted to the end device EG in question, and, after inputting a corresponding first or second ID number z1-z2, it is transmitted to the gatekeeper GK along with the identifier id. In the gatekeeper, the identifier id is entered in the first or second list L1, L2. If an E.164 number is detected, but no result of the check is available, the call can be accepted by the telephone subscriber at his end device EG for further checking and be output acoustically for a check. The result of the check can be communicated in accordance with the invention to the gatekeeper GK. If no identifier id can be detected by the ENUM service ENUMS, a third ID number z3 is input and transmitted to the gatekeeper GK along with the identifier id. Here the identifier id is entered in the third list L3 with the aid of the SPIT routine SPR.

When the fourth ID number z4 is input and transmitted, the call is conveyed to automatic call handing CALL-C by the gatekeeper GK or the back-to-back user agent. Automatic call handing CALL-C may be performed in the gatekeeper GK or be connected to the LAN as an independent device. Calls may be checked with several alternative methods in automatic call handling.

According to a first method, the speech pause/speech duration ratio of the received speech information is detected. Based on this ratio, it is possible to determine relatively certainly whether the received speech information is the speech information of a person or an automatic calling unit with speech advertising SPIT. This is possible because the speech pauses of calling equipment or automatic calling units are substantially shorter and the speech durations are longer than with calls from telephone subscribers or persons.

In another method for detecting calls from automatic calling units, speech samples of the incoming speech information can be recorded and compared with already recorded speech information from automatic calling units with telephone advertising SPIT. If these correspond with one another is extensively, it may be assumed that this is a call with telephone advertising SPIT.

According to another method for detecting calls from automatic calling units, an attempt is made by call handling CALL-C to interact with the incoming call, i.e., an input prompt is transmitted, which expects specific input from the caller. If the caller does not react, it may be assumed that it is a call with telephone advertising SPIT.

Depending on the results of the check, an appropriate ID number z1-z3 is generated for the identifier id of the call and transmitted to the gatekeeper GK; see FIG. 2b. In the gatekeeper GK, the identifier idx is entered into one of the three lists L1-L3 according to the transmitted ID number z1-z3.

The invention is not restricted to this exemplary embodiment, but may be used in all communication networks with different identifiers or addressing, wherein different lists may be used for the various networks. In addition, methods that have been coordinated therewith are also possible for detecting or identifying or determining calls with speech advertising.

The invention claimed is:

1. A method for managing lists for rejecting unwanted speech advertising in a packet-oriented network, comprising:
   a connection control device detecting a first identifier id of a first call, the first call being directed to a first end device of a subscriber;
   the connection control device utilizing a Spam Over Internet Telephony ("SPIT") routine to compare the first detected identifier id of the first call with a plurality of lists;
      if the first detected identifier id is contained in a first list of the plurality of lists, the connection control device rejecting the first call,
      if the first detected identifier id is contained in a second list of the plurality of lists, the connection control device relaying the first call to the first end device, and
      if the first detected identifier id is contained in a third list of the plurality of lists, the connection control device relaying the first call to the first end device and conveying information that indicates an evaluation with regard to speech advertising for the first detected identifier id could not be made; and the subscriber determining whether the relayed first call contains unwanted speech advertising;

the subscriber inputting a first piece of information at the first end device corresponding to one of the first list, the second list, and the third list or the subscriber inputting a second piece of information at the first end device;

if the subscriber inputs the first piece of information, the connection control device assigning the first detected identifier id to the first list, the second list, or the third list based on the first piece of information input by the subscriber;

if the subscriber inputs the second piece of information, the connection control device routing the relayed first call to an automatic call handling device in response to the second piece of information input by the subscriber or the connection control device generating a fourth piece of information for the relayed first call;

the automatic call handling device generating a third piece of information for the relayed first call if the connection control device routes the relayed first call to the automatic call handling device;

the connection control device assigning the first detected identifier id to the first list, the second list, or the third list based on the third piece of information or the fourth piece of information; and the connection control device detecting a second identifier id of a second call, the second call being directed to a second end device and utilizes the SPIT routine to compare the second detected identifier id with the plurality of lists;

if the second detected identifier id is contained in the first list, the second call being rejected, if the second detected identifier id is contained in the second list, the second call being routed to the second end device, and if the second detected identifier id is contained in the third list, the second call being routed to the second end device and conveying information to the second end device that indicates an evaluation with regard to speech advertising for the second detected identifier id could not be made.

2. The method of claim 1 wherein the connection control device is a gatekeeper or back-to-back user agent.

3. The method of claim 1 further comprising the automatic call handling device detecting a speech pause to speech duration ratio of speech information in the relayed call to determine whether the speech information is speech information from a person or speech information from an automatic calling unit.

4. The method of claim 1 further comprising the automatic call handling device recording speech samples from the relayed call and comparing the recorded speech samples with prerecorded speech information to determine whether the recorded speech samples are speech information from a person or speech information from an automatic calling unit.

5. The method of claim 1 further comprising the automatic call handling device interacting with the relayed call and determining whether the speech information in the relayed call is speech information from a person or speech information from an automatic calling unit based on a response to a prompt by the automatic call handling device.

6. The method of claim 1 wherein the connection control device performs the generating of the fourth piece of information after determining whether the call has SPIT.

7. The method of claim 1 further comprising querying a Telephony Number Mapping ("ENUM") service to determine if the detected identifier id is available in the ENUM service and if the detected identifier id is associated with SPIT.

8. The method of claim 7 further comprising the subscriber accepting the call at the end device if the detected identifier id is available in the ENUM service and the subscriber inputting the first or the second piece of information at the end device.

9. The method of claim 7 wherein if the detected identifier id is not available in the ENUM service, the connection control device enters the detected identifier id into the third list.

10. The method of claim 1 wherein the first list is a blacklist comprising a list of at least one identifier id that does have SPIT, the second list is a whitelist comprising a list of at least one identifier id that does not have SPIT, and the third list is a greylist comprising a list of at least one identifier id of which it was not able to be determined whether that at least one identifier id has SPIT.

11. The method of claim 1 wherein the connection control device utilizes an H.323 protocol or an SIP protocol.

12. An apparatus to reject unwanted speech advertising in a packet-oriented network comprising:

a connection control device having a Spam Over Internet Telephony ("SPIT") routine; and a first end device; and the connection control device detecting a first identifier id of a first call, the first call being directed to the first end device;

the connection control device using a SPIT routine to compare the first detected identifier id of the first call with a plurality of lists;

if the first detected identifier id is contained in a first list of the plurality of lists, the first call being rejected;

if the first detected identifier id is contained in a second list of the plurality of lists, the first call being relayed to the first end device;

if the first detected identifier id is contained in a third list of the plurality of lists, the first call being relayed to the first end device and the connection control device also conveying information to the first end device that indicates an evaluation with regard to speech advertising for the first detected identifier id could not be made;

a subscriber of the first end device determining whether the relayed first call contains unwanted speech advertising;

the subscriber inputting a first piece of information at the first end device corresponding to the first list, the second list, or the third list; and the connection control device assigning the first detected identifier id to the first list, the second list, or the third list based on the piece of information input by the subscriber or the connection control device further assessing the first call based on the piece of information input by the subscriber; and wherein the connection control device detecting a second identifier id of a second call, the second call being directed to a second end device; and the connection control device using the SPIT routine to compare the second detected identifier id with the plurality of lists;

if the second detected identifier id is contained in the first list, the connection control device rejecting the second call;

if the second detected identifier id is contained in the second list, the connection control device relaying the second call to the second end device;

if the second detected identifier id is contained in the third list, the connection control device relaying the second call to the second end device and conveying information to the second end device that indicates an evaluation with regard to speech advertising for the second detected identifier id could not be made.

13. The apparatus of claim 12 wherein the connection control device is a gatekeeper or a back-to-back user agent.

14. The apparatus of claim 12 wherein the connection control device further assesses the call by the connection control device routing the relayed call to an automatic call handling device in response to the piece of information input by the subscriber, the automatic call handling device generating an additional piece of information for the relayed call, the connection control device assigning the detected identifier id to the first list, the second list, or the third list based on the additional piece of information that is generated by the automatic call handling device.

15. The apparatus of claim 14 wherein the automatic call handling device detecting a speech pause to speech duration ratio of speech information in the relayed call to determine whether the speech information is speech information from a person or speech information from an automatic calling unit.

16. The apparatus of claim 14 wherein the automatic call handling device interacting with the relayed call and determining whether the speech information in the relayed call is speech information from a person or speech information from an automatic calling unit based on a response to a prompt by the automatic call handling device.

17. The apparatus of claim 12 wherein the first list is a blacklist comprising a list of at least one identifier id that does have SPIT, the second list is a whitelist comprising a list of at least one identifier id that does not have SPIT, and the third list is a greylist comprising a list of at least one identifier id of which it was not able to be determined whether that at least one identifier id has SPIT.

18. The apparatus of claim 12 wherein the first list, the second list, and the third list are stored in the connection control device.

* * * * *